Feb. 21, 1950  E. C. HARTWIG  2,498,269
SEQUENCE WELD TIMER
Filed July 3, 1948

WITNESSES:  
E. A. McCloskey  
New C. Groome

INVENTOR  
Edward C. Hartwig.  
BY  
Hyman Diamond  
ATTORNEY

Patented Feb. 21, 1950

2,498,269

UNITED STATES PATENT OFFICE 2,498,269

SEQUENCE WELD TIMER

Edward C. Hartwig, Tonawanda, N. Y., assignor to Westinghouse Electric Corporation, East Pittsburgh, Pa., a corporation of Pennsylvania Application July 3, 1948, Serial No. 36,963

11 Claims. (Cl. 315—246)

My invention relates to electric discharge apparatus and it has particular relation to electronic timers.

In the welding industry both for resistance and for arc welding, sequence timers have come into wide use. These timers include a plurality of electronic timing circuits or components for timing the various sequential operations of the apparatus. In each electronic timing component the timing is measured by a time constant network customarily including an energy storage component and a component for discharging the energy accumulated in it. The component is charged when the apparatus is quiescent and is discharged following operation of the initiating switch. Many resistance welders now available include sequence timers which provide for a Squeeze time, a Weld time, a Hold time and an Off time.

The Squeeze time is the interval during which the welding electrodes are engaged with the material to be welded and the proper pressure for welding is applied. For many welding operations it is desirable that the Squeeze time for the first weld be substantially longer than the Squeeze time for subsequent welds. Such a condition may, for example, arise in a system in which the movable welding electrode is in the rest position displaced a relatively long distance from the material while during the welding operation, between welds, the distance is substantially shorter. In such a system the movable electrode consumes a longer time to move into engagement with the material for the first weld than it does for the succeeding welds of a series.

The Weld component of a sequence timer determines the interval during which the welding current flows. The Hold component determines the interval during which the electrodes are held in engagement with the material while it is cooling after the weld. The Off component determines the resetting time for successive welds. Under certain circumstances the Weld, Hold and Off times may be shorter or longer for the initial weld than for subsequent welds. For example, if a long strip is being welded it may become heated by conductions during the first few welds to such an extent that substantially less welding time is required for the others. Similar conditions may arise for Hold and Off times.

It is accordingly an object of my invention to provide a sequence timer, the characteristic time of any of the components of which shall be of different duration for the first operation than for subsequent operations.

Another object of my invention is to provide a sequence timer for a resistance welder which shall have a different Squeeze time for the first operation than for subsequent operations.

Another object of my invention is to provide an electronic timer capable of operating at different characteristic timing intervals.

A more specific object of my invention is to provide an electronic timer that shall have a different time interval during its first operation than during subsequent operations.

In accordance with my invention I provide a timer in which the energy storage component is connected between the control electrode of the timing tube and a terminal intermediate the supply buses. The potential difference between the intermediate terminal and one of the supply buses is less than that between the intermediate terminal and the other supply bus. Prior to the initiation of the operation of the timer the cathode of the timer tube is connected in effect to the latter supply bus and the energy storage circuit is completed through the cathode to the latter bus. Following the first operation (or for that matter a selected operation) the cathode is connected to the other bus and the charging circuit is completed through the cathode to this bus. Impedances designed to provide the different timings are interposed in these different energy storage circuits.

The novel features that I consider characteristic of my invention are set forth with particularity in the appended claims. The invention itself, however, both as to its organization and method of operation together with further objects and advantages thereof will be understood by reference to the following description taken in connection with the accompanying drawing in which:

Figure 1:
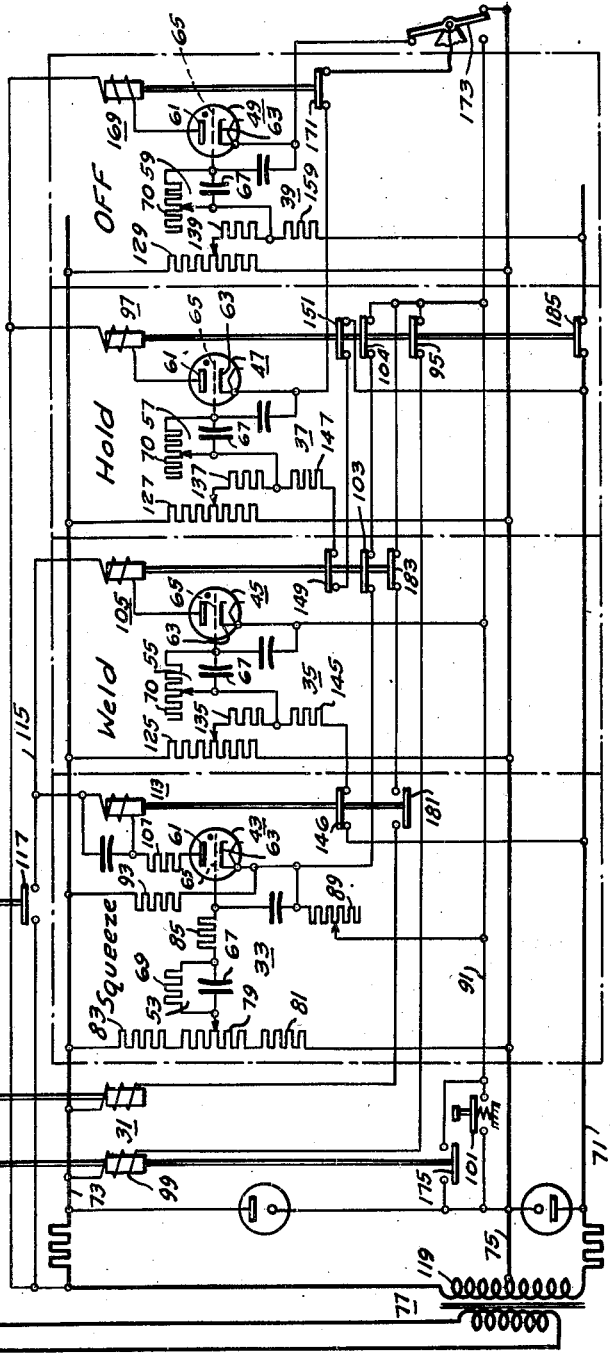
Fig. 1 is a circuit diagram of a preferred embodiment of my invention.
Figure 1:
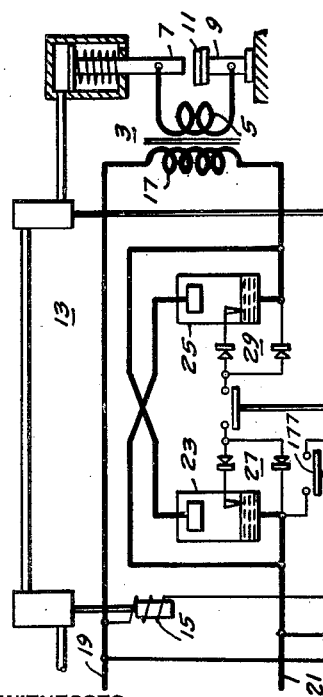

The apparatus shown in Fig. 1 comprises a welding transformer 3 across the secondary 5 of which welding electrodes 7 and 9 are connected. One of these electrodes 7 may be moved into engagement with the work 11 under pressure provided by a hydraulic system 13. The flow of fluid through this system is controlled from a solenoid 15.

Power is ordinarily supplied to the primary 17 of the welding transformer 3 from the main buses 19 and 21 of a commercial supply through a pair of ignitrons 23 and 25 connected in anti-parallel, The anti-parallel ignitrons may be replaced by any other contactor, for example, thyratrons, mechanical contacts or a single ignitron. The ignitrons 23 and 25 are provided with firing circuits 27 and 29 respectively, and the operation of these circuits is initiated by the actuation of a firing relay 31.

A sequence timer including Squeeze, Weld, Hold, and Off timing components 33, 35, 37 and 39 respectively is provided for timing the various operations of the welding system. Each of the timing components includes an electric discharge device 43, 45, 47 and 49 respectively, which is preferably a thyratron, and a time constant network 53, 55, 57 and 59 respectively. Each thyratron 43, 45, 47, 49 has at least an anode 61, a cathode 63 and a control electrode 65. The Squeeze network 53 includes a capacitor 67 and a shunting resistor 69. The Weld, Hold and Off networks 55, 57 and 59 include a capacitor 67 and a shunting rheostat 70. The timing may also be effected electromagnetically and in this event the energy storage component is an inductor and the discharging component includes a coupling to this inductor designed to absorb the flux therein.

The timing components 33, 35, 37, 39 are supplied from terminal auxiliary buses 71 and 73 and an intermediate bus 75 which derive the power from the main buses 19 and 21 through a transformer 77. Between the intermediate bus 75 and one terminal bus 73, a rheostat 79 is connected in series with a pair of resistors 81 and 83. Resistor 83 is substantially larger than resistor 81. One terminal of the Squeeze network 53 is connected to the movable tap of this rheostat 79. The rheostat is so adjusted that the voltage drop between its movable tap and the intermediate bus 71 is smaller than the voltage drop between the movable tap and the upper bus 73. The Squeeze network 53 is connected at its other terminal to the control electrode 63 of the Squeeze thyratron 43 through a current limiting resistor 85. The cathode 65 of the Squeeze thyratron 43 is connected through a second rheostat 89 to a conductor 91 and through a resistor 93 to the bus 73. This conductor 91 is initially connected through one of the normally closed contactors 95 of a Hold relay 97 and the exciting coil 99 of the initiating relay to one of the auxiliary buses 73. It may be connected through the starting switch 101 to the intermediate bus 75. Initially the second rheostat 89 is short-circuited through normally closed contactors 103 and 104 of a Weld relay 105 and the Hold relay 97, respectively. The anode 61 of the Squeeze thyratron 43 is connected through a current limiting resistor 107 and the exciting coil of a Squeeze relay 113 to a conductor 115. This conductor may be connected by the closing of a back pressure switch 117 to one terminal of the secondary 119 of the transformer 77.

The Weld, Hold and Off rheostats 125, 127 and 129 respectively are connected between the two buses 73 and 75. One of the terminals in each of the Weld, Hold and Off networks 55, 57, 59 is connected through resistor 135, 137, 139 respectively to the adjustable tap of its corresponding rheostat 125, 127, 129 respectively. The same terminal of the Weld network 55 is connected through another resistor 145 and a normally closed contactor 146 of the Weld relay 113 to the remaining auxiliary bus 71. The same terminal of the Hold network is connected through another resistor 147 and normally closed contactors 149 and 151 of the Weld and Hold relays 105 and 97 respectively to this auxiliary bus 71. The same terminal of the Off network is connected through another resistor 159 directly to this auxiliary bus 71. The other terminals of the Weld, Hold and Off networks 55, 57, 59 are connected each to a control electrode 65 of its associated thyratron 45, 47, 49, respectively. The resistors 135, 137 and 139 are of substantially higher magnitude than resistors 145, 147 and 159, respectively.

The anode 61 of the Weld thyratron 45 is connected through the exciting coil of the Weld relay 105 to the conductor 115. The exciting coils of the Hold and Off relays 97 and 169 respectively are connected directly to the upper terminal of the secondary 117.

The cathode 63 of the Weld thyratron 45 is connected directly to the conductor 91 to which the second voltage divider 89 is connected. The cathode of the Hold thyratron 47 is connected to the intermediate bus 75 through the normally closed contactor 171 of the Off relay 169 and contacts of the repeat, non-repeat switch 173. The cathode of the Off thyratron 49 is connected to this same bus through the repeat, non-repeat switch.

Before the start switch is close the capacitor 67 in each of the timing networks 53, 55, 57, 59 is charged. The Squeeze time capacitor is charged during the half periods when the lower auxiliary bus 75 is positive in a circuit extending from that bus to the adjustable tap of the rheostat 79, through the network 53, the control electrode 65, and cathode 63 of the Squeeze thyratron 43, the normally closed contactors 103 and 104 of the Weld and Hold relays 105 and 97, the exciting coil 99 of the initiating relay to the upper auxiliary bus 73. The right-hand plate of the capacitor 67 is charged negative and the left-hand plate positive. The capacitor thus impresses a biasing potential between the control electrode 65 and the cathode 63 of the Squeeze thyratron, the magnitude of which is determined by the setting of the first rheostat 79. In the preferred practice of my invention, this potential is equal to the peak difference of potential between the adjustable tap of the rheostat 79 and the upper bus 73. The capacitor of the Weld, Hold, and Off networks are similarly charged during the intervals when the lowest auxiliary bus 71 is positive and the intermediate bus 75 negative.

When the start switch 101 is closed an energizing circuit is closed from the conductor 91 and through the contactor 95, through the exciting coil 99 of the initiating relay. This relay is therefore actuated and locked in through one of its now closed contactors 175. Through another now closed contactor 177 the initiating relay (99) closes an energizing circuit through the fluid pressure solenoid 15. The movable electrode 7 is now actuated to engage the work 11. Eventually the back pressure switch 117 closes.

When the starting switch 101 is closed the conductor 91 is connected to the rheostat 81, and therefore the cathode 63 of the Squeeze thyratron 43 is directly connected to the intermediate auxiliary bus 75. During the half-periods when the upper auxiliary bus 73 is negative the cathode 63 is now positive with respect to the control electrode 65 and charging current no longer flows to the capacitor 65 of the Squeeze network. During these half-periods therefore the capacitor is discharged through the resistor 69. During the intervening half-periods the control electrode 65 is negative relative to the cathode so long as a substantial charge remains on the capacitor, because the potential of the adjustable tap of the rheostat 79 is nearer that of the bus 75 than that of bus 73 and the capacitor is initially charged to a higher potential. The capacitor 67 therefore continues to discharge decreasing the biasing potential impressed on the thyratron 43. After a predetermined time interval the composite potential made up of decreasing biasing potential and the superimposed alternating potential derived from the auxiliary buses 73 and 75, attains a magnitude at which the Squeeze thyratron 43 is energized. This event occurs after the movable electrode 7 has become properly seated on the work 11 and the back pressure switch 117 has been properly closed.

When the Squeeze thyratron 43 is rendered conductive the Squeeze relay 113 is actuated. At its now closed contactor 181, it closes a circuit through the exciting coil of the firing relay 31, which includes a normally closed contactor 183 of the Weld relay 105 and the switch 101 or the holding contactor 175 of the initiating relay (99). The firing relay 31 is actuated and the ignitrons 23 and 25 are fired so that welding current is conducted.

At the now open contactor 146 of the Squeeze relay 113, the charging circuit for the Weld capacitor 67 is opened and this capacitor discharges through its associated rheostat 70. The potential impressed through the high resistor 135 is insufficient to replenish the decaying charge. After welding current has been conducted for a predetermined time interval the Weld thyratron 45 is rendered conductive and the Weld relay 105 is actuated. At the now open contactor 183 of the Weld relay 105, the circuit through the exciting coil of the firing relay 31 is opened and the ignitrons 23 and 25 are rendered nonconductive. At another now open contactor 103 of the Weld relay 105 the short-circuit across the rheostat 89 is opened.

The cathode 65 of the Squeeze thyratron 43 is now connected through conductor 91, through the second rheostat 89 to the intermediate bus 75. During the half-periods of the supply when the intermediate bus 75 is positive and the upper bus 73 is negative the control electrode 65 of the Squeeze thyratron 43 is positive relative to its cathode 63 to an extent dependent on the setting of the rheostat 89 and its relationship to resistor 93. The higher the resistance presented by the rheostat 89 the greater this difference of potential. While the other operations of the system are in process the Squeeze capacitor 67 is now charged with its right-hand plate negative and its left-hand plate positive during these half periods to a potential equal to the peak potential difference between the adjustable tap of the rheostat 79 and the intermediate bus 75. A biasing potential is impressed by this capacitor 67 in the control circuit of a Squeeze thyratron 43. In the preferred practice of my invention, the rheostat 89 is so set that this bias is smaller than the initial bias; in the practice of the broader aspects of my invention it may be larger. In any event, the bias is sufficient to render the Squeeze thyratron 43 non-conductive.

At the third now open contactor 149 of the Weld relay 105, the charging circuit for the Hold capacitor 67 is opened. At a predetermined time interval after the actuation of the Weld relay 105, the Hold thyratron 47 is rendered conductive and the Hold relay 97 is actuated.

At the now open contactor 95 of the Hold relay the circuit through the exciting coil 99 of the initiating relay is opened. When the welding system is set for Repeat, the start switch 101 is held closed and therefore the resulting opening of the lock-in contactor 175 of the initiating relay (99) does not affect the operation of the Squeeze timing component. At a second now open contactor 104 of the Hold relay 97 the short-circuit across the rheostat 89 is provided with a second open point. This point is provided so that the short-circuit may be maintained open when the Weld thyratron 45 is rendered non-conductive dropping out the Weld relay 105 after the squeeze thyratron 43 is rendered non-conductive and the Squeeze relay 113 drops out closing the charging circuit through the Weld capacitor 67. At a third now open contactor 151, the charging circuit for the Hold capacitor 67 is provided with a second open point. This second open point is provided to prevent the charging of the Hold capacitor 67 and the resulting dropping out of the Hold relay 97 following the dropping out of the Weld relay 105. At a fourth now open contactor 185 of the Hold relay 97 the charging circuit for the Off capacitor 67 is opened.

After a predetermined time interval the Off capacitor 67 has discharged to a potential such that the Off thyratron 49 is rendered conductive. The Off relay 169 is actuated and at its now open contactor 171 opens the cathode circuit through the Hold thyratron 47 rendering the latter non-conductive. The Hold relay 97 now drops out.

At one of its now closed contactors 151, the Hold relay 97 resets the charging circuit for the Hold capacitor 67. At another of its now closed contactors 185, it resets the charging circuit for the Off capacitor. The Off thyratron is rendered non-conductive and the Off relay 109 drops out.

Through the now closed contactors 103 and 104 of the Weld and Hold relays 105 and 97, respectively, and the start switch 101, the cathode 63 of the Squeeze thyratron 43 is now directly connected to the intermediate bus 75. When the intermediate bus 75 is now positive relative to the adjustable tap of rheostat 79, the cathode 63 of the thyratron 43 is positive relative to its control electrode 65 and the charging of the Squeeze capacitor is prevented. The Squeeze capacitor now discharges during a time interval dependent on the charge which it has accumulated, and therefore, dependent on the setting of the rheostat 89 and reinitiates the operation of the system. The system now operates with a Squeeze time determined by the setting of the rheostat 89 and continues to operate with this Squeeze time so long as this start switch 101 remains closed.

Figure 2:
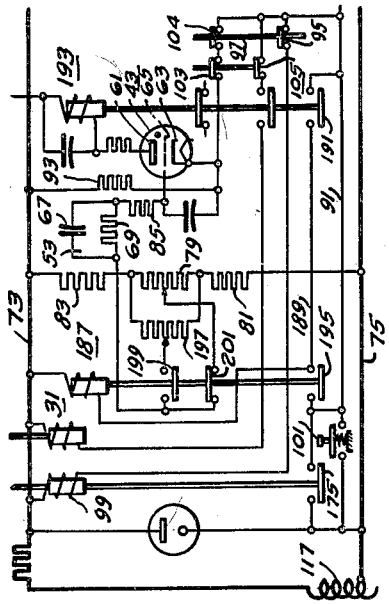
Fig. 2 is a circuit diagram of a modification of my invention.

Of the system illustrated in Fig. 2, only the Squeeze component and portions of the initiating Weld and Hold relays 105 and 97 are shown. This Squeeze component is on the whole similar to the Squeeze component of the Fig. 1 system. It includes in addition to the latter an auxiliary relay 187, the exciting coil of which is connected at one terminal to the upper auxiliary bus 71 and at a lower terminal to a conductor 189 which is adapted to be connected to the intermediate bus 75 through a normally open contactor 191 of a Squeeze relay 193 and the start switch 101. The auxiliary relay 187 is also provided with a normally open contactor 195 which locks out the normally open contactor 191 of the Squeeze relay 193.

The Squeeze component does not include a rheostat analogous to the rheostat 89 of the Fig.

1 system. In lieu thereof it includes a rheostat 197 connected in parallel with the rheostat 79. The adjustable tap of this rheostat 197 is adapted to be connected to one terminal of the Squeeze network 53 through a normally open contactor 199 of the auxiliary relay 187. The adjustable tap of the rheostat 79 is connected to this same terminal through a normally closed contactor 201 of the same relay.

Before the operation of the system is initiated the Squeeze capacitor 67 is charged during the half-periods when the intermediate bus 75 is positive in a circuit extending from the adjustable tap of the rheostat 79 through the normally closed contactor 201, the capacitor 67, the control electrode 65 and cathode 63 of the thyratron 43, the normally closed contactors 103, 104 and 95 of the Weld and Hold relays 105 and 97, the exciting coil 99 of the initiating relay to the upper auxiliary bus 71. This charging operation impresses the usual blocking biasing potential between the control electrode and cathode of the thyratron 43.

When the start switch 101 is actuated the cathode of the thyratron 43 is connected directly to the intermediate bus 75 and the charging of the capacitor 67 is interrupted. After a time interval predetermined by the setting of the rheostat 79, the Squeeze thyratron 43 becomes conductive actuating the Squeeze relay 193. At its now closed contactor 191, the Squeeze relay closes a circuit through the exciting coil of the auxiliary relay 187. The auxiliary relay is actuated and is locked in through its now closed contactor 195 so long as the start switch 101 remains closed. At its now open contactor 201, the auxiliary relay opens the circuit between the network 53 and the rheostat 79, and at its now closed contactor 199, it closes a circuit between this network and the rheostat 197. The resistor 93, to which the cathode of the Squeeze thyratron 43 is connected, the rheostat 197 and the resistors 81 and 83 are so selected that when the intermediate bus 75 is negative and the upper bus is positive, and the Hold or Weld relays 105 and 97 are pulled up (contractors 103, 104, 95 open), the control electrode 65 of the Squeeze thyratron 43 is positive relative to the cathode 63. The capacitor of the Squeeze network is charged to a biasing potential dependent on the setting of the rheostat 197 which is preferably smaller, but may be larger than, the first biasing potential. When the Weld and Hold relays 105 and 97 drop out, the Squeeze capacitor discharges and the thyratron 43 is rendered conductive after a time interval dependent on the setting of the rheostat 197. This Squeeze interval is interposed so long as the starting switch 101 remains closed.

My invention has been illustrated herein as applied only to the Squeeze timing component. In accordance with its broader aspects it is applicable to the other timing components or to the timing components of any other system such as that of an arc welder or other sequencing apparatus.

While I have shown and described a certain specific embodiment of my invention, I am fully aware that many modifications thereof are possible. My invention therefore is not to be restricted except insofar as is necessitated by the prior art and by the spirit of the appended claims.

I claim as my invention:

1. In combination an electric discharge device having an anode, a cathode and a control electrode; a capacitor; first and second terminals for connection to an alternating current supply; connections including said first terminal, said capacitor and said control electrode in series; connections including said second terminal and said cathode in series; connections for discharging said capacitor and a switch for connecting said cathode to said first terminal.

2. In combination an asymmetrically conductive path having a first electrode and a second electrode; an energy storage component; connections for discharging said component, first and second terminals for connection to an alternating current supply; connections including said first terminal, said component and said first electrode in series; connections including said second terminal and said second electrode in series and a switch for connecting said second electrode to said first terminal.

3. In combination an electric discharge device having an anode, a cathode and a control electrode; a capacitor; connections for discharging said capacitor; first and second terminals for connection to a source of alternating current; a third terminal for deriving a potential intermediate the potential difference between said first and second terminals; connections including said third terminal, said capacitor and said control electrode in series; connections including said second terminal and said cathode in series and a switch for connecting said cathode to said first terminal.

4. In combination an electric discharge device having an anode, a cathode and a control electrode; a time constant network; first and second terminals for connection to a source of alternating current, a third terminal for deriving a potential intermediate the potential between said first and second terminals; first connections including said third terminal, said network and said control electrode in series, a voltage dropping component; second connections including said second terminal, said component and said cathode in series and a switch for connecting said cathode to said first terminal.

5. In combination an electric discharge device having an anode, a cathode and a control electrode; a time constant network; first and second terminals for connection to a source of alternating current, a third terminal for deriving a potential intermediate the potential between said first and second terminals; first connections including said third terminal, said network and said control electrode in series; a voltage dropping component; an impedance, said impedance and said cathode in series and a switch for connecting the junction of said component and said impedance to said first terminal.

6. In combination an electric discharge device having an anode, a cathode and a control electrode; a time constant network; first and second terminals for connection to a source of alternating current, a third terminal for deriving a potential intermediate the potential between said first and second terminals; first connections including said third terminal, said network and said control electrode in series; a voltage dropping component; an impedance, said impedance and said cathode in series; a switch for connecting the junction of said component and said impedance to said first terminal; low resistance connections across said component and other connections to said device responsive to the conductivity of said device for open circuiting said low resistance connections.

7. In combination an electric discharge device having an anode, a cathode and a control electrode; a time constant network; first and second terminals for connection to a source of alternating current; a third terminal for deriving a potential intermediate the potential between said first and second terminals; first connections including said third terminal, said network and said control electrode in series, an impedance; second connections including said second terminal, said impedance and said cathode in series and a switch for connecting said cathode to said first terminal.

8. In combination an electric discharge device having an anode, a cathode and a control electrode; a time constant network; first and second terminals for connection to a source of alternating current; a third terminal for deriving a potential intermediate the potential between said first and second terminals; first connections including said third terminal, said network and said control electrode in series, an impedance; a fourth terminal initially disconnected from said first terminal for deriving a potential intermediate the potential between said first and second terminals; said fourth terminal and said cathode in series and a switch for connecting said fourth terminal to said first terminal.

9. In combination an electric discharge device having an anode, a cathode and a control electrode; a time constant network; first and second terminals for connection to a source of alternating current; a third terminal for deriving a potential intermediate the potential between said first and second terminals; a fourth terminal for deriving a potential intermediate the potential between said first and second terminals; first connections including said third terminal, said network and said control electrode in series, a first impedance; second connections including said second terminal, said impedance and said cathode in series; a second impedance connected between said first and fourth terminals; a switch for connecting said cathode to said first terminal, and, connections responsive to conductivity of said discharge device for disconnecting said fourth terminal from said first terminal.

10. In combination an electric discharge device having an anode, a cathode and a control electrode; a time constant network; first and second terminals for connection to a source of alternating current; a third terminal for deriving a potential intermediate the potential between said first and second terminals; first connections including said third terminal, said network and said control electrode in series, an impedance; a fourth terminal initially disconnected from said first terminal for deriving a potential intermediate the potential between said first and second terminals; said fourth terminal and said cathode in series; a switch for connecting said cathode to said first terminal, low resistance connections between said fourth terminal and said cathode and connections responsive to the conductivity of said device for opening said low resistance connections.

11. In combination, a first terminal and a second terminal adapted to be connected to an alternating current supply, a third terminal, connections including a resistance between said first and third terminals, connections including a substantially lower resistance between said third and second terminal, a rectifier having fourth and fifth terminals, said rectifier conducting positive current from said fourth to said fifth terminal, an energy storage component, connections between said component and said fourth terminal and connections selectable at the will of an operator between said fifth terminal and said first and second terminals.

EDWARD C. HARTWIG.

REFERENCES CITED

The following references are of record in the file of this patent:

UNITED STATES PATENTS

| Number | Name | Date |
|---|---|---|
| 2,371,056 | Livingston | Mar. 6, 1945 |
| 2,371,981 | Few | Mar. 20, 1945 |
| 2,416,595 | Reynolds | Feb. 25, 1947 |
| 2,431,284 | Stadum | Nov. 18, 1947 |
| 2,443,660 | Large et al. | June 22, 1948 |
| 2,445,549 | Wittenberg | July 20, 1948 |